United States Patent
Yang et al.

(10) Patent No.: US 8,724,279 B2
(45) Date of Patent: May 13, 2014

(54) SYSTEM AND METHOD FOR SHORT CIRCUIT PROTECTION

(75) Inventors: Zhaoang Yang, Shanghai (CN); Haiyang Liu, Shanghai (CN); Zhongxuan Tu, Shanghai (CN); Jianxin Zhang, Shanghai (CN)

(73) Assignee: STMicroelectronics R & D (Shanghai) Co., Ltd., Shanghai (CN)

( * ) Notice: Subject to any disclaimer, the term of this patent is extended or adjusted under 35 U.S.C. 154(b) by 667 days.

(21) Appl. No.: 12/892,726

(22) Filed: Sep. 28, 2010

(65) Prior Publication Data

US 2011/0075308 A1    Mar. 31, 2011

(30) Foreign Application Priority Data

Sep. 29, 2009  (CN) .......................... 2009 1 0175706

(51) Int. Cl.
*H02H 3/08*    (2006.01)
*H02H 9/02*    (2006.01)

(52) U.S. Cl.
USPC ....................................................... 361/93.1

(58) Field of Classification Search
USPC .......................................... 361/18, 93.1, 93.9
See application file for complete search history.

(56) References Cited

U.S. PATENT DOCUMENTS

| | | | | |
|---|---|---|---|---|
| 3,754,182 A * | 8/1973 | Morris et al. | ................. | 323/299 |
| 4,533,970 A * | 8/1985 | Brown | ................. | 361/58 |
| 4,704,572 A * | 11/1987 | Melbert | ................. | 323/275 |
| 5,831,471 A * | 11/1998 | Nakajima et al. | ................. | 327/540 |
| 6,201,674 B1 * | 3/2001 | Warita et al. | ................. | 361/18 |
| 6,424,512 B1 * | 7/2002 | Schmacht | ................. | 361/93.1 |
| 6,538,492 B2 * | 3/2003 | Sano et al. | ................. | 327/530 |
| 6,870,721 B2 * | 3/2005 | Chen | ................. | 361/88 |
| 7,203,046 B2 * | 4/2007 | Ohshima | ................. | 361/93.1 |
| 7,206,178 B2 * | 4/2007 | Friedrichs et al. | ................. | 361/93.1 |
| 7,268,992 B2 * | 9/2007 | Hallak et al. | ................. | 361/93.7 |
| 7,339,775 B2 * | 3/2008 | Kimura | ................. | 361/93.1 |
| 7,342,761 B2 * | 3/2008 | Covault | ................. | 361/93.1 |
| 7,660,091 B2 * | 2/2010 | Nakajima | ................. | 361/93.1 |
| 7,751,157 B2 * | 7/2010 | Migliavacca | ................. | 361/18 |
| 7,813,095 B2 * | 10/2010 | Adi | ................. | 361/93.1 |
| 8,040,649 B2 * | 10/2011 | Kido et al. | ................. | 361/93.1 |
| 2003/0206387 A1 * | 11/2003 | Newman et al. | ................. | 361/93.1 |
| 2007/0188959 A1 * | 8/2007 | Akerlund et al. | ................. | 361/93.1 |
| 2007/0217238 A1 * | 9/2007 | Kanayama | ................. | 363/125 |
| 2009/0303649 A1 * | 12/2009 | Huber et al. | ................. | 361/93.1 |

* cited by examiner

*Primary Examiner* — Stephen W Jackson
*Assistant Examiner* — Christopher Clark
(74) *Attorney, Agent, or Firm* — Slater & Matsil, L.L.P.

(57) ABSTRACT

In one embodiment, a system for providing short circuit protection is disclosed. The system has a supply circuit and a series switch. The supply circuit has a supply input and a supply output, and is configured to deliver an output current at the supply output, and to disable the supply output if the output current exceeds a first current limit. The series switch coupled between the supply output of the supply circuit and a supply node, and the supply node is configured to be coupled to a load.

17 Claims, 3 Drawing Sheets

SYSTEM AND METHOD FOR SHORT CIRCUIT PROTECTION

CROSS REFERENCE TO RELATED APPLICATION

This application claims the priority benefit of China patent application number 200910175706.0, filed on Sep. 29, 2009, entitled "Short Circuit Protection With Switch Solution For Embedded System," which is hereby incorporated by reference to the maximum extent allowable by law.

TECHNICAL FIELD

This invention relates generally to electronic circuits, and more particularly to a system and method for short circuit protection.

BACKGROUND

Smart card technology for such applications as credit cards, identity cards, and secure access to computer systems and transportation is becoming more pervasive. Generally, a smart card contains a small, externally powered integrated circuit, such as a microprocessor mounted on a pocket size card. The integrated circuit can be programmed to interface to a smart card reader to authenticate financial transactions, provide secure access to computer systems, and verify identity, for example. Because the integrated circuit within the smart card is externally powered, a smart card typically has a number of electrical contacts on a face of the card, which can be interfaced to corresponding contacts of data and power interface within a smart card reader.

A typical smart card interface includes eight metal pads. Among these pads are a power pad and a ground pad, which is typically shared with the power system within the card reader. If someone were to insert a defective smartcard with shorted contacts or piece of sheet metal within the card reader, however, a short circuit between the power and ground pads of the smart card reader could result. Such a short circuit could disable the smart card interface and possibly shut down the system coupled to the smart card interface. Such a system shut-down is problematic, particularly in systems that perform financial transactions such as cash or banking machines.

In the past, the problem of short circuit protection within smart card readers has been addressed by using one-off fuses, self-reset fuses or isolated power supplies. One-off fuses are problematic in that the mechanism of the fuse takes a long time to act, thereby triggering a system reset after the onset of a short circuit at the smart card power supply interface. Furthermore, one-off fuses creates difficulties with system maintenance in that a triggered one-off fuse typically requires replacement or manual reset by a technician, which results in down-time and loss of profit from revenue generating machines.

A smart-card system using a self-reset fuse can restart once the short circuit condition is removed. Self-reset fuses, however, may take too long to trigger, may not provide adequate protection to the entire smart card system.

Another way to deal with the problem of a short circuit between power contacts of a smart card reader is to isolate the smart card power supply from the main power supply, for example, by using a separate and independent power supply. A short circuit on the smart card interface will, therefore, not affect the power supply for the whole smart card system. The extra power supply is more expensive to manufacture, and still leaves the smart card power supply vulnerable to damage caused by short circuits.

FIG. 1 illustrates smart card reader system 100 according to the prior art. System 100 has power supply 102, connector interface 106, and smart card reader electronics 104. Power supply 102 supplies power to the entire smart card reader system, and smart card reader electronics 104 contains, for example, a microprocessor or microcontroller, memory and interface electronics to perform the functions of the smart card reader. Connector interface 106 is physically configured to accept a smart card and has a plurality of connector terminals 108, 110, 112, 114, 116, 118, 120 and 122 that make contact with a smart card (not shown). Power to the smart card is supplied by power pin 108 and ground pin 110. Global ground 101 is supplied to power supply 102, smart card reader electronics 104 and connector interface 106.

If power pin 108 is connected to ground pin 110 forming short circuit 130, a high current $I_{SS}$ will result. Such a short circuit can be formed, for example, by a inserting a defective or damaged smart card into connector interface 106, or by inserting a slug or a piece of sheet metal into connector interface 106. If the sum of $I_{SS}$ and the current drawn by the rest of the system is greater than the rated current of power supply 102, damage to power supply 102 and/or system failure may result.

In the field of power supplies, what are needed are cost effective systems and methods that quickly detect and disable a short circuit condition in one portion of a system without affecting the performance of the remaining portions of the system.

SUMMARY

In one embodiment, a system for providing short circuit protection is disclosed. The system has a supply circuit and a series switch. The supply circuit has a supply input and a supply output, and is configured to deliver an output current at the supply output, and to disable the supply output if the output current exceeds a first current limit. The series switch is coupled between the supply output of the supply circuit and a supply node, and the supply node is configured to be coupled to a load.

In another embodiment, a circuit for providing short circuit protection to a load is disclosed. The circuit has a first transistor, a second transistor, a first resistor, a second resistor and a third resistor. The first transistor has an input terminal coupled to a supply input, an output terminal coupled to a supply output, and a control terminal. The second transistor has an input terminal coupled to a first supply reference potential, an output terminal coupled to the control terminal of the first transistor, and a control terminal. The first resistor is coupled between the supply input and the control terminal of the first transistor, the second resistor is coupled between the supply output and the control terminal of the second transistor, and the third resistor is coupled between the supply input and the control terminal of the second transistor.

In a further embodiment, a method for providing short circuit protection of a power supply is disclosed. The method has the steps of supplying a current to a load through a series transistor and determining if the current exceeds a first threshold. If the current exceeds the first threshold, the step of shutting off a control transistor having an output node coupled to a control node of the series transistor is performed such that the control transistor shuts off the series transistor.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present disclosure will be described with respect to embodiments in a specific context, namely a system and method for short circuit protection for an IC card reader system, such as a smart card system. Embodiments of this invention may also be applied to other circuits and systems that require protection from short circuits and high current conditions.

Figure 1:
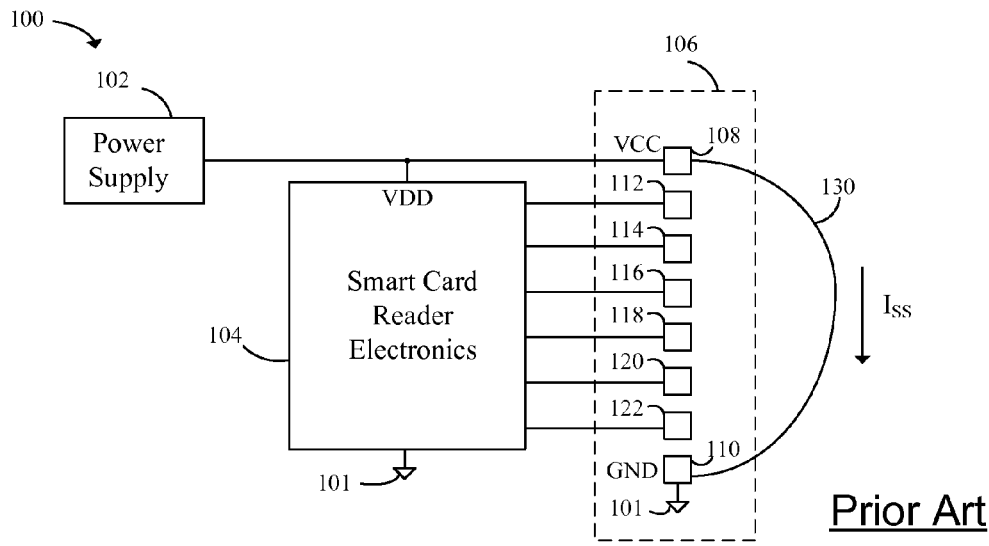
FIG. 1 illustrates a schematic of a prior art card reader system.
Figure 2:
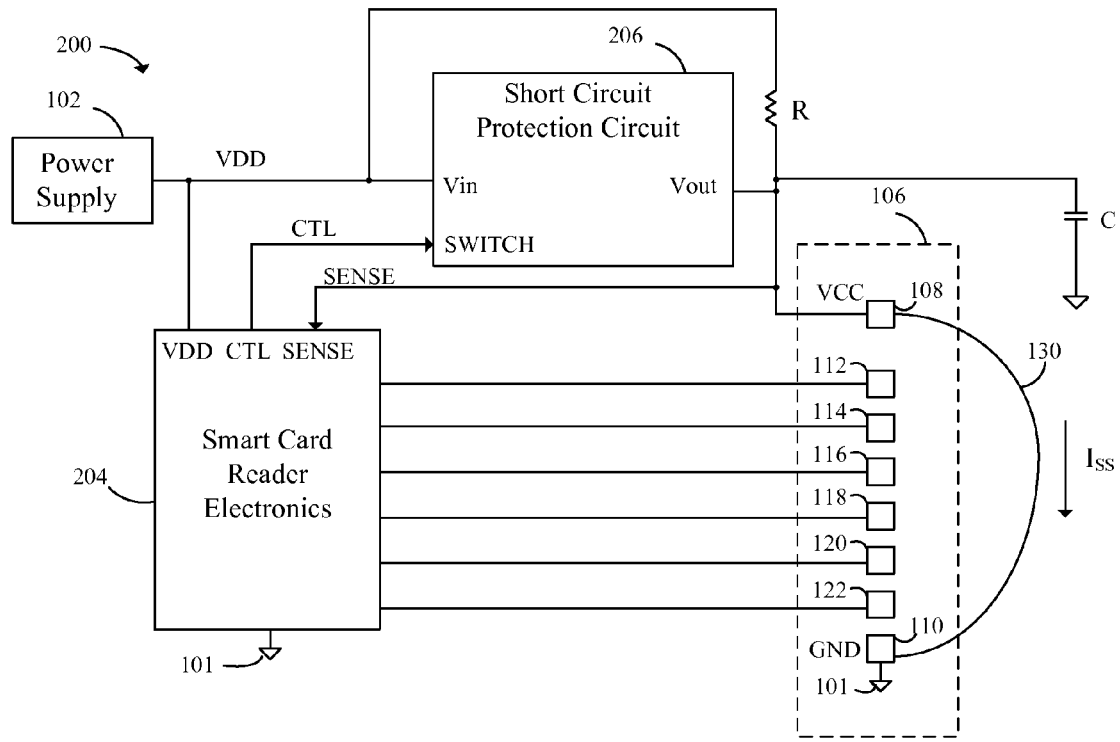
FIG. 2 illustrates a schematic of an embodiment card reader system.

FIG. 2 illustrates a smart card reader system 200 according to an embodiment of the present disclosure. System 200 has power supply 102, smart card reader electronics 204, connector interface 106, and short circuit protection circuit 206. In an embodiment, short circuit protection circuit 206 provides a low series resistance between Vin and Vout during normal operation when signal CTL is LOW (e.g, at ground potential or zero volts). If the current drawn through pin 108 (VCC) in connector 106 exceeds a certain current threshold, the impedance between Vin and Vout becomes very high, thereby effectively shutting off the power supply at connector 106. In embodiments of the present disclosure, a short circuit condition 130, e.g., between power 108 and ground pins 110 of connector 108, only creates short circuit current $I_{SS}$ for a short period of time, which depends on the turn off speed of a selected transistor within the short circuit protection circuit, for example, between 5 ns and 15 ns before short circuit protection circuit 206 attains a high impedance state. In alternative embodiments of the present invention, short-circuit protection circuit 206 can shut down faster or slower depending on the implementation and system requirements.

In an example embodiment, smart card reader electronics 204 sets signal CTL HIGH during system startup, thereby disabling the power supply to VCC at power-up. The SENSE input to smart card reader electronics 204 polls the power supply voltage VCC at connector 106 during startup to check if the voltage at VCC pin 108 is at the power supply voltage VDD via pull-up resistor R. If the voltage of VCC pin 108 is at or about VDD, or exceeds a certain threshold, smart card reader electronics 204 will enable short circuit protection circuit 206 by bringing signal CTL low. If the path from VCC pin 108 to GND pin 110 was recently shorted, capacitor C will be in a discharged state and smart card electronics 204 will wait until capacitor C becomes recharged via pull-up resistor R. The sensing feature in smart card electronics 204 prevents the power supply at VCC pin 108 from becoming enabled in the presence of a short circuit condition. In an example embodiment, the value of pull-up resistor R is about 10 KΩ and the value of C is about 1 µF, which yields a settling time of about 10 ms. In alternative embodiments, other values and/or time constants can be used for resistor R and capacitor C.

In alternative embodiments, CTL can be active high, or eliminated altogether. In further embodiments, other threshold, voltage and current levels can be used. The short circuit protection circuit can be used to provide short circuit protection for other systems and applications besides smart card readers, for example, in commercial or consumer electronics such as computers, cellular telephone, etc.

Figure 3:
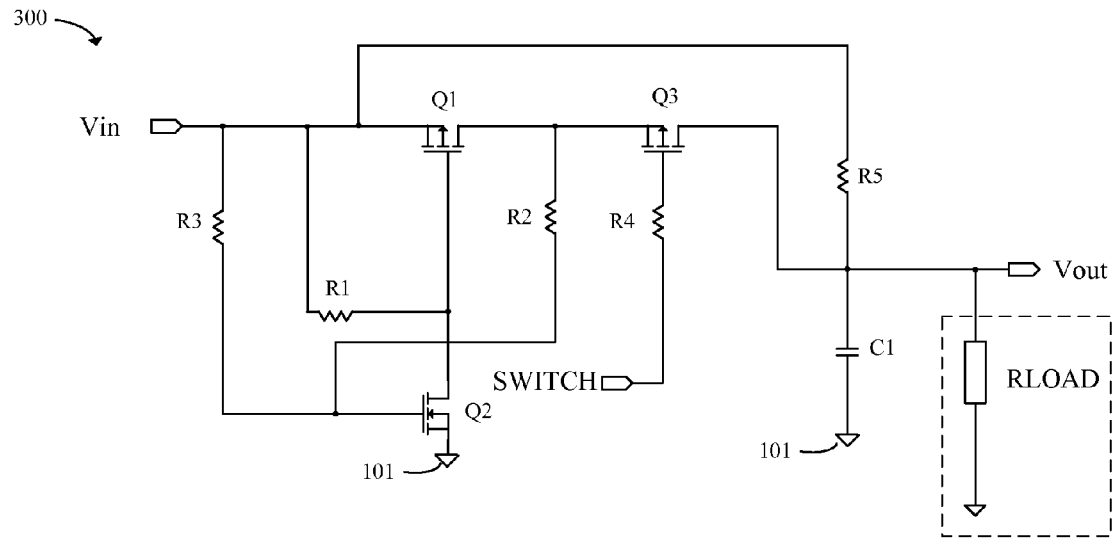
FIG. 3 illustrates a schematic of an embodiment short circuit protection circuit.

Turning to FIG. 3, an embodiment schematic of a short circuit protection circuit 300 is illustrated. The main topology of the embodiment short circuit protection circuit 300 uses PMOS transistor Q1, NMOS transistor Q2, and resistors R1, R2 and R3 to automatically detect a short-circuit condition at Vout. Resistor R2 preferably has a much lower resistance than resistor R3, for example, 100× as much. An additional PMOS transistor Q3 is used as a switch for powering a load coupled to Vout ON and OFF. Resistor R4 provides protection to the gate of Q3, and pull-up resistor R5 charges capacitor C1 to voltage Vin to provide a way to detect a recent short circuit condition, as described above. By selecting suitable component parameters, the main power supply coupled to Vin is protected from a fault condition during the time that Vout is short-circuited.

According to an embodiment, signal SWITCH is set HIGH prior to power being applied to a load coupled to Vout, thereby shutting OFF PMOS device Q3. Because the drain-source resistance $R_{DS}$ of Q3 is at a high impedance, the gate of NMOS device Q2 is charged up to Vin, which turns on NMOS device Q2. When Q2 turns on, the gate of PMOS device Q1 is pulled LOW toward ground, thereby turning on PMOS device Q1, so that the voltage at the drain of Q1 is about equal to the voltage at Vin. In alternative embodiments, other device types besides MOSFETs, such as BJT or JFET devices, can be used for transistors Q1, Q2 and Q3, for example. In further embodiments, the polarity of the NMOS and PMOS devices can be reversed depending on the system and its requirements, for example, in systems using negative supply voltages.

When PMOS device Q3 is turned on by setting signal SWITCH LOW, current is supplied to RLOAD via PMOS devices Q1 and Q3. Since R2 is much less than R3 and RLOAD is not short circuited, the gate of NMOS device Q2 will remain HIGH and power will continue to be supplied to the load. NMOS device Q2 will remain on as long as the gate voltage of NMOS device Q2 is greater than the threshold of Q2. The gate voltage of Q2 is mainly contributed by drain voltage of Q2, which is equal to Vin minus $V_{SD}$ of PMOS device Q1.

If, however, the Vcc of the smart card or the circuit to be protected, is short circuited to ground, the gate of NMOS device Q2 will be pulled low via R2. This will lead to the shutting off of Q2, thereby allowing the gate of Q1 to be pulled to Vin via pull-up resistor R1, thereby shutting off Q1 to isolate RLOAD from the main power supply. R3 preferably has an optimal range of values. If R3 is too small, power consumption will be increased during the period in which the load is short circuited. If, on the other hand R3 is too large, NMOS device Q2 may be prevented from turning on.

In one example embodiment, component parameters of Q2, Q3, R2 and R3 are selected to guarantee that Q2 turns on when switching transistor Q3 is off. Q2 turns on when the following conditions are met at startup:

$$V_{GS2} = V_{IN} \frac{R_2 + R_{DS(off)3} + R_{LOAD}}{R_3 + R_2 + R_{DS(off)3} + R_{LOAD}} > V_{GS(th)2},$$

where $V_{IN}$ is the input voltage, $V_{GS2}$ is the gate-source voltage of Q2, $V_{GS(th)2}$ is the threshold voltage of Q2, $R_{DS(off)3}$ is the static drain-source off resistance of Q3, and $R_{LOAD}$ is the nominal load resistance.

When Q3 is turned on and no short circuit occurs, and the power supply is operating under the nominal conditions, the following conditions are met to keep Q1 and Q2 at ON status to provide power supply to load:

$$V_{GS2} = V_{IN} \frac{R_2 + R_{DS(on)3} + R_{LOAD}}{R_3 + R_2 + R_{DS(on)3} + R_{LOAD}} + V_{D1} \frac{R_3}{R_2 + R_3} > V_{GS(th)2},$$

where $R_{DS(on)3}$ is the static drain-source on resistance of Q3 and $V_{D1}$ is the drain voltage of Q1.

In summary, the circuit of FIG. 3 operates in at least three modes. The first mode is when transistor Q3 is turned off, in which case transistors Q1 and Q2 switch on automatically by themselves but no power is provided to the smart card (or circuit to be protected). A second mode is when Q3 is on and a short circuit occurs. In this case Q1 and Q2 automatically switch off to cut off the power supply to the smart card (or circuit to be protected) so that the power supply is isolated from the main power supply Vin. A third mode is when Q3 is on and the smart card (or circuit to be protected) is operating normally.

Figure 4:
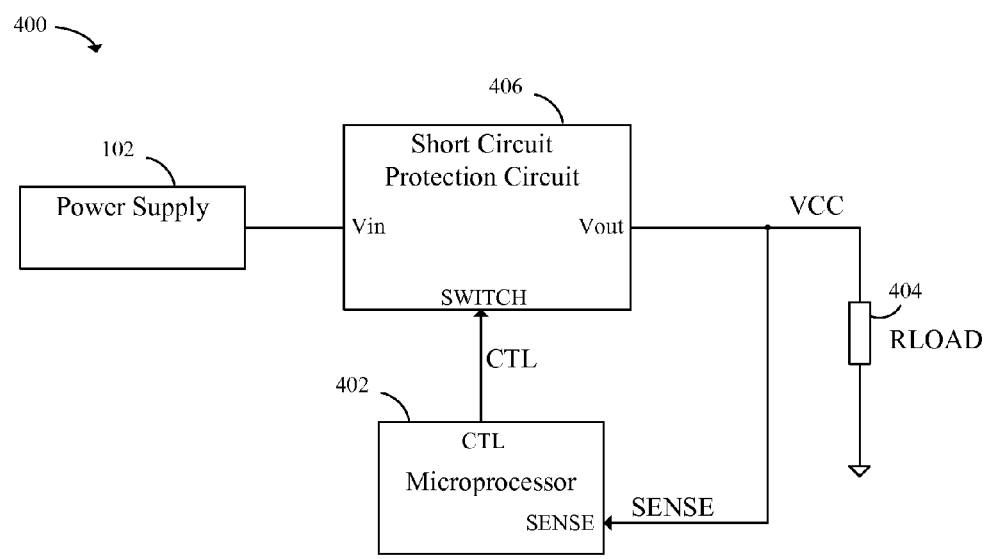
FIG. 4 illustrates a schematic of an embodiment power supply system.

Turning to FIG. 4, an embodiment power supply system 400 is illustrated. The system has power supply 102, short circuit protection block 406, Microprocessor 402 and a load 404 represented by RLOAD. Here, microprocessor 402 is interfaced via signal CTL to control the ON/OFF state of short circuit protection circuit 406. The power supply is sensed by the SENSE input of the microprocessor to ensure that load 404 is not short-circuited prior to turning on the power via short circuit protection block 406. The embodiment of FIG. 4 is suitable for use in smart card reading systems, as well as other systems that require short circuit protection.

Figure 5:
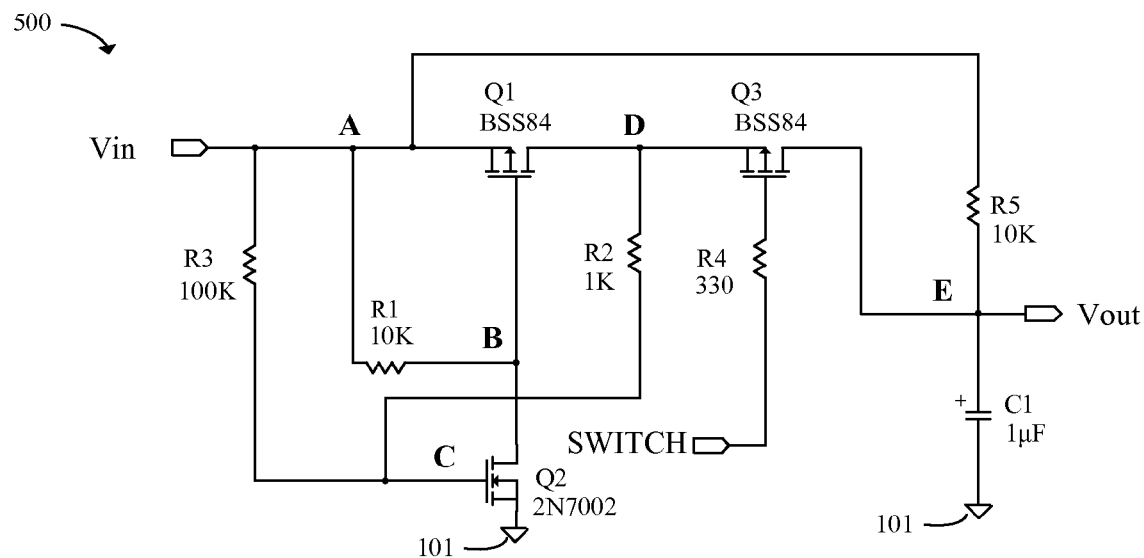
FIG. 5 illustrates a schematic of a further embodiment short circuit protection circuit.

FIG. 5 illustrates short circuit protection circuit 500 according to an embodiment. The topology of the embodiment of FIG. 5 is similar to the topology of FIG. 3, with component parameters listed in Table 1.

TABLE 1

Circuit Parameters

| Item | Value |
|---|---|
| Vin | 5 V/3.3 V |
| R1 | 10 KΩ |
| R2 | 1 KΩ |
| R3 | 100 KΩ |
| R4 | 330 Ω |
| R5 | 10 KΩ |
| C1 | 1 μF |
| Q1 | BSS84 |
| Q2 | 2N7002 |
| Q3 | BSS84 |

Table 2 lists the parameters of the 2N7002 NMOS device, and Table 3 lists the parameters of the BSS84 PMOS device used in the embodiment of FIG. 5.

TABLE 2

Parameters of BSS84

| Symbol | Parameter | Test Conditions | Min. | Typ. | Max. | Unit |
|---|---|---|---|---|---|---|
| VGS(th) | Gate Threshold Voltage | $V_{DS} = V_{GS}$; $I_D = -1$ mA | -0.8 | -2 | | V |
| td(on) | Turn-on time | $V_{GS} = 0$ to $-10$ V $V_{DD} = -40$ V $I_D = -200$ mA | | 3 | | ns |
| td(off) | Turn-off time | $V_{GS} = -10$ to 0 V $V_{DD} = -40$ V $I_D = -200$ mA | | 3 | | ns |
| RDS(on) | Static drain-source on resistance | $V_{GS} = 0$ to $-10$ V $V_{DD} = -40$ V $I_D = -200$ mA | | | 10 | Ω |

TABLE 3

Parameters of 2N7002

| Symbol | Parameter | Test Conditions | Min. | Typ. | Max. | Unit |
|---|---|---|---|---|---|---|
| VGS(th) | Gate Threshold Voltage | $V_{DS} = V_{GS}$; $I_D = 250$ μA | 1 | 2.1 | 3 | V |
| td(on) | Turn-on time | $V_{DD} = 30$ V $I_D = 500$ mA | | 5 | | ns |
| td(off) | Turn-off time | RG = 4.7 Ω; $V_{GS} = 4.5$ V | | 7 | | ns |
| RDS(on) | Static drain-source on resistance | $V_{GS} = 10$ V, $I_D = 500$ mA; | | 1.8 | 5 | Ω |
| | | $V_{GS} = 4.5$ V, $I_D = 500$ mA; | | 2 | 5.3 | Ω |

Short circuit protection circuit 500 can be analyzed as follows using the following variables:

$V_{DS(th)x}$ Gate Threshold Voltage of Qx;
$V_{DS(on)x}$ Static drain-source on voltage of Qx;
$R_{DS(off)x}$ Static drain-source off voltage of Qx;
$R_{DS(on)x}$ Static drain-source on resistance of Qx;
$R_{LOAD}$ Load Resistance;
$V_A$ Voltage at node A;
$V_B$ Voltage at node B;
$V_C$ Voltage at node C; and
$V_D$ Voltage at node D.

When the system power supply is on and Q3 is off, which corresponds to the case where the smart card (or the circuit to be protected) is not powered on:

$$V_{IN} = 5V,$$

$$V_{GS2} = V_{IN} \frac{R_2 + R_{DS(off)3} + R_{LOAD}}{R_3 + R_2 + R_{DS(off)3} + R_{LOAD}} > V_{GS(th)2},$$

$$R_{DS(off)3} \gg R_3.$$

From the above, the gate-source voltage of Q2 can be found to be:

$$V_{GS2} \approx V_{IN} = 5V > V_{GS(th)2}.$$

This condition will lead Q2 to switch on in several nanoseconds, which results in:

$$V_B = V_{DS(on)2} \approx 0, \text{ and}$$

$$|V_{GS1}| \approx V_{IN} > V_{GS(th)1}.$$

With the gate of Q1 greater than its threshold, Q1 will also switch on in several nanoseconds, resulting in:

$$V_D = V_{IN} - V_{DS(on)1} \approx V_{IN},$$

at which point the power supply is ready to operate normally.

When load short circuit occurs while transistor Q3 is on, it is assumed that $V_{DS(ON)3} \approx 0$ and $R_{LOAD} = 0$ in this circumstance, therefore:

$$V_{GS2} = V_{IN} \frac{R_2 + R_{DS(on)3} + R_{LOAD}}{R_3 + R_2 + R_{DS(on)3} + R_{LOAD}}.$$

Substituting in the component values:

$$V_{GS2} = V_{IN} \frac{1,000 + 5 + 0}{100,000 + 1000 + 5 + 0} \approx 0.01 V_{IN} = 0.01 \times 5V = 0.05V.$$

Since $0.05V < V_{GS2(th)2}$,
Q2 will shut off in several nanoseconds, resulting in $V_B$ being pulled up to $V_{IN}$ via resistor R1.
Since, $$V_B \approx V_{IN},$$

$$V_{GS1} \approx 0 < V_{GS(th)1},$$

which will lead to Q1 switching off in several nanoseconds. As a result, any load or short circuit a terminal Vout is effectively disconnected from a power supply coupled to Vin.

It should be noted that the above analysis pertains to a particular embodiment. In alternative embodiments, different voltage levels and component values can be used, which will affect the analysis accordingly.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A system for providing short circuit protection, the system comprising:
   a supply circuit comprising
      a supply input,
      a supply output,
      a first transistor comprising an input terminal coupled to the supply input, an output terminal coupled to the supply output and a control terminal,
      a first resistance coupled between the supply input and the control terminal of the first transistor,
      a second transistor comprising an input terminal coupled to a supply reference potential, an output terminal coupled to the control terminal of the first transistor, and a control terminal,
      a second resistance coupled between the supply output and the control terminal of the second transistor; and
      a third resistance coupled between the supply input and the control terminal of the second transistor, wherein the supply circuit is configured to deliver an output current at the supply output, and disable the supply output if the output current exceeds a first current limit; and
   a series switch coupled between the output terminal of the first transistor at the supply output of the supply circuit and a supply node, wherein the supply node is configured to be coupled to a load.

2. The system of claim 1, wherein the supply circuit is configured to be reset when the series switch is shut off.

3. The system of claim 1, further comprising:
   a resistance coupled between the supply node and a first reference voltage; and
   a capacitance coupled between the supply node and a second reference voltage, wherein the capacitance is configured to be discharged after the supply node is exposed to a short circuit condition.

4. The system of claim 3, further comprising a controller, the controller comprising an input coupled to the supply node and an output coupled to a control terminal of the series switch, wherein the controller is configured to turn-on the series switch if a potential difference between the supply node and the second reference voltage is greater than a first voltage threshold.

5. The system of claim 4, wherein the second reference voltage comprises a ground voltage.

6. The system of claim 1, wherein the first transistor comprises a PMOS transistor and the second transistor comprises an NMOS transistor.

7. The system of claim 1, further comprising an IC card reader coupled to the supply circuit.

8. A circuit for providing short circuit protection to a load, the circuit comprising:
   a first transistor comprising
      an input terminal coupled to a supply input,
      an output terminal coupled to a supply output, and
      a control terminal;
   a first resistor coupled between the supply input and the control terminal of the first transistor;
   a second transistor comprising
      an input terminal coupled to a first supply reference potential,
      an output terminal coupled to the control terminal of the first transistor, and
      a control terminal;
   a second resistor coupled between the supply output and the control terminal of the second transistor; and a third resistor coupled between the supply input and the control terminal of the second transistor.

9. The circuit of claim 8, further comprising a third transistor comprising an input terminal coupled to the supply output, an output terminal coupled to a supply node, and a control terminal.

10. The circuit of claim 9, wherein:
the first, second and third transistors comprise MOS transistors;
the input terminals of the first, second and third transistors comprise sources;
the output terminals of the first, second and third transistors comprise drains; and
the control terminals of the first, second and third transistors comprise gates.

11. The circuit of claim 9, further comprising:
a capacitor coupled between the supply node and the first supply reference potential; and
a fourth resistor coupled between a second reference potential and the supply node.

12. The circuit of claim 9, wherein the first supply reference potential comprises a ground potential.

13. The circuit of claim 8, wherein the circuit is configured to provide short circuit protection to an IC card reader.

14. The circuit of claim 9, further comprising a controller, the controller comprising an input coupled to the supply node and an output coupled to a control terminal of the third transistor, wherein the controller is configured to turn-on the third transistor if a potential difference between the supply node and the first supply reference potential is greater than a first voltage threshold.

15. A method for providing short circuit protection of a power supply, the method comprising:
supplying a current to a load through a series transistor, and through a switch transistor coupled between the series transistor and the load after enabling the switch transistor;
determining if the current to the load exceeds a first threshold;
if the current exceeds the first threshold, shutting off a control transistor comprising an output node coupled to a control node of the series transistor, wherein the control transistor shuts off the series transistor, wherein shutting off the control transistor comprises lowering a voltage of a control node of the control transistor via a first resistor coupled between the control node of the control transistor and an output node of the series transistor; and
resetting the series transistor, wherein resetting comprises disabling the switch transistor,
turning on the control transistor via a pull-up resistor coupled between a supply node and the control node of the control transistor, and
turning on the series transistor, wherein turning on the series transistor comprises turning on the series transistor via the output node of the control transistor coupled to the control node of the series transistor.

16. The method of claim 15, further comprising:
enabling the power supply, enabling the power supply comprising
measuring a voltage at the load, and
enabling the switch transistor if the voltage at the load exceeds a second threshold.

17. The method of claim 15, further comprising providing power to an IC card reader interface via the power supply.

* * * * *